(12) United States Patent
Wehrli

(10) Patent No.: US 7,230,200 B2
(45) Date of Patent: Jun. 12, 2007

(54) WIRE CUTTING DEVICE, WIRE TRANSPORT SYSTEM, AND METHOD FOR SEVERING OF A WIRE ELECTRODE IN AN EDM MACHINE

(75) Inventor: Peter Wehrli, Ascona (CH)

(73) Assignee: Agie SA., Losone (CH)

( * ) Notice: Subject to any disclaimer, the term of this patent is extended or adjusted under 35 U.S.C. 154(b) by 0 days.

(21) Appl. No.: 11/200,447

(22) Filed: Aug. 8, 2005

(65) Prior Publication Data

US 2006/0049146 A1    Mar. 9, 2006

(30) Foreign Application Priority Data

Sep. 8, 2004    (EP)    ................... 04021362

(51) Int. Cl.
*B23H 7/10* (2006.01)
*B26D 1/15* (2006.01)
*B26D 1/24* (2006.01)

(52) U.S. Cl. ..................... 219/69.12; 83/592

(58) Field of Classification Search ............ 219/69.12; 83/161, 165, 167, 591, 592; 140/123.6, 139
See application file for complete search history.

(56) References Cited

U.S. PATENT DOCUMENTS

| | | | | |
|---|---|---|---|---|
| 1,336,605 A | * | 4/1920 | Becker | 83/277 |
| 1,897,970 A | * | 2/1933 | Hofmann et al. | 83/277 |
| 2,454,241 A | * | 11/1948 | Wennerber | 83/592 |
| 2,707,026 A | * | 4/1955 | Hoern | 83/592 |
| 2,857,000 A | * | 10/1958 | Swanbum | 83/260 |
| 2,929,289 A | * | 3/1960 | Gorecki | 83/411.5 |
| 3,011,376 A | * | 12/1961 | Wrigh et al. | 83/199 |
| 3,625,101 A | * | 12/1971 | Leveque | 83/592 |
| 5,047,607 A | | 9/1991 | Briffod | 219/69.12 |
| 5,523,538 A | | 6/1996 | Matsuda | 219/69.12 |
| 5,533,365 A | * | 7/1996 | Sangiacomo | 83/592 |
| 5,866,865 A | * | 2/1999 | Bezzola et al. | 219/69.12 |
| 6,078,019 A | | 6/2000 | Medici et al. | 219/69.12 |
| 6,209,432 B1 | * | 4/2001 | Matsuda | 83/342 |
| 6,815,630 B1 | * | 11/2004 | Ishihara et al. | 219/69.12 |

FOREIGN PATENT DOCUMENTS

| | | | |
|---|---|---|---|
| DE | 3631888 A1 | * | 4/1988 |
| DE | 196 07 705 A1 | | 9/1997 |
| EP | 281 511 B1 | | 9/1988 |
| EP | 1 153 688 A1 | | 11/2001 |
| JP | 11216619 | | 8/1999 |
| JP | 2001-212720 A | * | 8/2001 |

* cited by examiner

*Primary Examiner*—Geoffery S. Evans
(74) *Attorney, Agent, or Firm*—Marshall, Gerstein & Borun LLP

(57) ABSTRACT

A wire cutting device for an electrical discharge machining (EDM) machine with a wire draw-off device, which moves a wire electrode along a feed direction into a cutting zone of the EDM machine; and with a deflection unit in order to deflect the wire electrode running in the feed direction into the cutting zone from the feed direction into a cutting area, in which at least one cutting edge acts on the wire electrode in the cutting area in order to cut it.

17 Claims, 5 Drawing Sheets

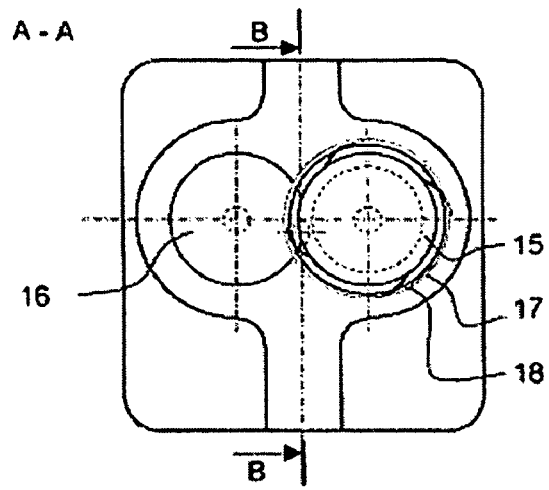
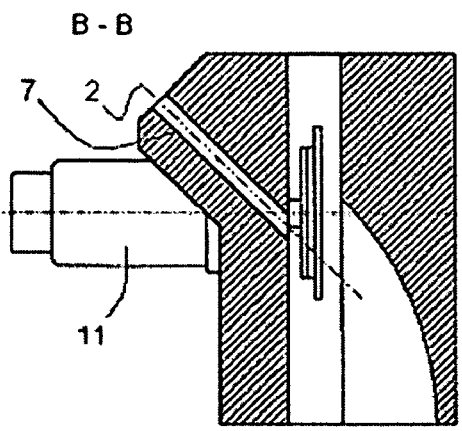
Fig. 2a
Fig. 2b
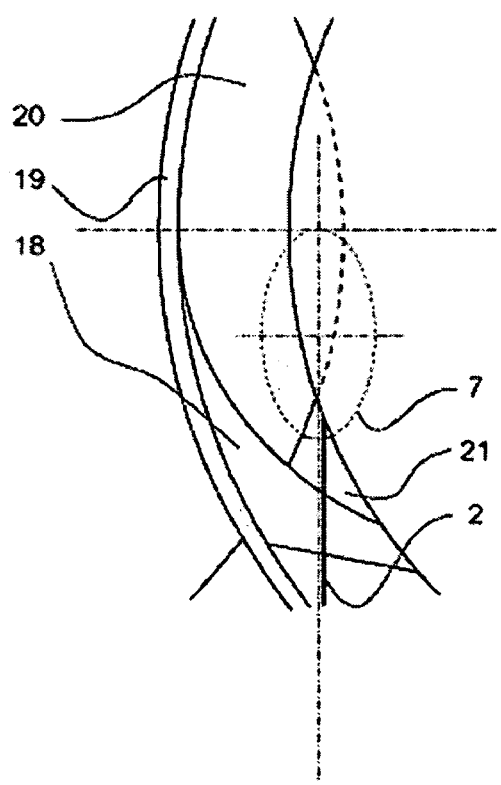
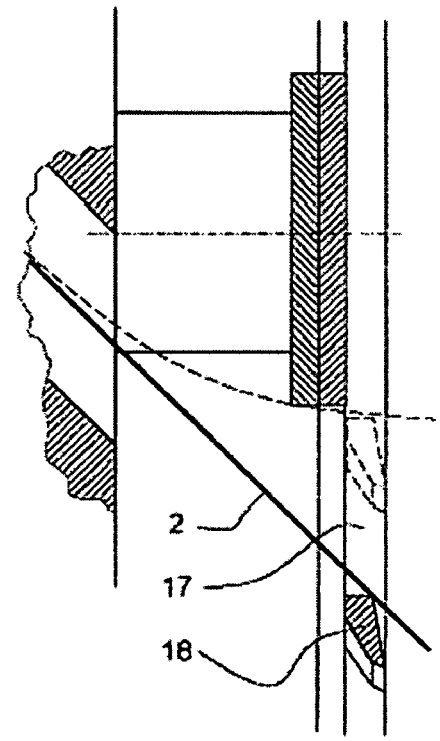
Fig. 2c
Fig. 2d

WIRE CUTTING DEVICE, WIRE TRANSPORT SYSTEM, AND METHOD FOR SEVERING OF A WIRE ELECTRODE IN AN EDM MACHINE

BACKGROUND OF THE INVENTION

1. Field of the Invention

The invention generally concerns the field of electrical discharge machining (EDM), i.e. machine tools in which an electric discharge between a wire or strip-like tool electrode and a workpiece causes material removal on the workpiece. In particular, the invention concerns a wire transport system for transporting the wire or strip-like electrode through the EDM machine and a wire cutting device to sever the wire electrode in a disposal area following the work area of the EDM machine. The invention also concerns a method for cutting of such a wire electrode.

2. Related Technology

Countless individual nonstationary electric discharges, separated from each other in space and time within a dielectric fluid occur, between a tool electrode and a workpiece in electrical discharge machining. Removal is based on extreme local heating at the location of spark discharge, during which the material evaporates. EDM machines of the type just mentioned utilize the removal effect of spark erosion. During machining the tool electrode is subject to a certain wear because of the spark discharges. For this reason the tool electrode is provided in the case of a wire erosion machine as a continuous wire electrode that passes through the work area of the EDM machine during workpiece machining and is continuously renewed.

For this purpose, a wire transport system is provided, which unwinds the wire electrode from a supply spool, guides it through the work area and transports it to a disposal area, as is known, for example, from DE 196 07 705 A1. In the disposal area the wire electrode is usually cut into small pieces a few centimeters long for space-saving disposal.

A wire cutting device is known from EP 281 511 B1 that has a rotating cutting drum and an elastic mating drum with a rubber coating rotating opposite to it. The cutting drum has cutting edges arranged parallel to the axis of rotation, which are forced against the surfaces of the mating drum during rotation of the cutting drum. The wire electrode is passed between the cutting drum and the mating drum and cut by means of the cutting edge.

This type of wire cutting device, among other things, has the shortcoming that cutting severely loads the cutting drum and the strongly abrasive wire electrode also loads the rubber coating of the mating drum. The elastic coating therefore degrades relatively quickly.

It is neither possible to deactivate the shown wire cutting device so that the wire electrode can be introduced to a disposal container uncut. This is useful, especially in wire electrodes with a diameter of 0.1 mm or less, because they require comparatively little space in the disposal container, so that cutting is not necessary for space-saving disposal. These fine wire electrodes ordinarily consist of tungsten, molybdenum or iron, i.e. materials having higher strength values relative to the conventional wire electrode materials, copper or copper-zinc alloys. The high shear strength of such wires causes additional wear during cutting.

A wire cutting device for an EDM machine is known from EP 1 153 688 A1 in which the wire electrode is guided through a guide tube to a cutting area in which one end of the guide tube forms a cutting edge. A rotating cutting drum with cutting edges arranged essentially parallel to the axis of rotation is arranged on the end of the guide tube so that the cutting edge of the cutting drum is moved transversely over the end of the guide tube and grasps and severs the wire electrode pushed forward on this account.

In this wire cutting device it is neither possible to deactivate the wire cutting device with small diameters of the wire electrode easily so that the wire electrodes can be guided into the disposal area uncut.

GENERAL DESCRIPTION

The invention provides an improved wire cutting device for a wire transport system in an EDM machine. The invention also provides an improved method for cutting the wire electrode in an EDM machine, with which it is possible to reliably cut wire electrodes of different diameter, different cross-section, and different material.

Accordingly, the invention provides a wire cutting device, a wire transport system, and a method for cutting a wire electrode.

According to a first aspect of the invention, a wire cutting device for an EDM machine has a wire transport device, which moves a wire electrode along a feed direction into a cutting zone of the EDM machine. By means of a deflection unit, the wire electrode running in the feed direction in the cutting zone can be deflected from the feed direction, for example, transversely to it, i.e., with at least one motion component perpendicular to the feed direction, into a cutting area in which at least one cutting edge acts on the wire electrode in the cutting area in order to cut it.

The wire cutting device of the invention therefore has a deflection unit in which the wire electrode can be moved laterally from the feed direction in the cutting zone and cut there. Since the cutting area is then arranged offset relative to the feed direction, movement of the wire electrode is largely unhampered by the cutting elements in the cutting area. The deflection unit does not act on movement of the wire electrode along the feed direction, but only in an area offset to it. The frequency at which the wire electrode is cut in the cutting area can be set and controlled with the deflection unit, and it is even possible to entirely deactivate the wire cutting device by deactivating the deflection unit. The wire electrode is then essentially no longer deflected transversely to the feed direction and not moved into the cutting area. A wire cutting device is therefore provided that reliably cuts wire electrodes, in particular, of different cross-section and different thickness, which are subject to limited wear and can be deactivated simply, especially in small wire diameters.

According to one variant of the invention the deflection unit can be configured so as to deflect and cut the wire electrode running in the feed direction after a specified advance of the wire electrode in the cutting area. In this manner the wire electrode can be cut into wire pieces of adjustable length.

The wire cutting device may have a first cutting element rotating around an axis of rotation, whose peripheral edge is formed at least partially as first cutting edge, and a second cutting element with a second cutting edge in order to form the cutting area. The wire transport device guides the wire electrode into the cutting zone, during which the feed direction runs across the cutting edges and at least with one direction component parallel to the axis of rotation of the first cutting element. Because of this means to sever the wire electrode in the cutting area are made easily available.

Preferably the first cutting edge of the cutting element and the second cutting edge can form an acute angle in the cutting area. The cutting elements can have a rough surface on their peripheral edges. These expedients facilitate driving of the wire electrode in the cutting area.

According to another variant of the invention the second cutting element can be rotatable and the second cutting edge formed on a peripheral edge of the second cutting element. In particular, it is advantageous if the second cutting element is configured in order to rotate in a direction of rotation opposite that of the first element. This can be implemented according to one variant by coupling the second cutting element to the first cutting element so that the second cutting element rotates because of rotation of the first cutting element. In this manner a low-wear cutting device that is mechanically simple to implement can be provided. In particular, coupling of the two cutting elements can be implemented by positioning one section of the first cutting element against a section of the second cutting element so that during rotation of the first cutting element the second cutting element is entrained by frictional mating and/or shape-mating. In particular, with frictional mating, the two cutting elements lie directly against each other so that buckling or jamming of the wire electrode between the two cutting elements is impossible. It is possible to arrange the second cutting element with reference to the feed direction behind the first cutting element and also to arrange the second cutting element with reference to the feed direction in front of the first cutting element.

According to another variant of the invention the deflection unit can have a stop element, which is movable so that the wire electrode is deflected into the cutting area across the feed direction with at least one movement component. In particular, it can be prescribed that the deflection unit be coupled to the first cutting element and/or the second cutting element so that the wire electrode movable in the feed direction is cyclically grasped by the stop element and moved from the feed direction into the cutting area. This has the advantage that no separate control or drive of the deflection unit is necessary, since deflection of the wire electrode is accomplished by rotation of the first or second cutting element.

The deflection unit and the first cutting element or the deflection unit and the second cutting element are then preferably designed as a unit, in which the stop element protrudes from the peripheral edge of the first and/or second cutting element.

Several stop elements can be provided on the peripheral edge of the first or second cutting elements, in which the outermost ends of the stop elements with reference to an axis of rotation of the first or second cutting element are connected to each other with an outer ring so that two adjacent stop elements, the corresponding cutting edge of the first or second cutting element and the outer ring form a passage through which the wire electrode is guided. The passage has the advantage that it forms a guide for the wire electrode so that the wire electrode cannot leave the region of the deflection unit, i.e. the region in which the deflection unit deflects the wire electrode.

According to another variant of the invention, the first cutting element and the second cutting element can have a peripheral edge with one or more protrusions, on which stop edges are situated, these protrusions forming the deflection unit. This represents a possibility of combining the deflection unit with the cutting element and therefore reducing the number of parts in the wire cutting device.

According to another variant of the invention, the second cutting element is designed fixed. The number of moving parts in the wire cutting device can be reduced on this account so that reliability is increased.

According to another variant of the invention, the deflection unit can have a fluid nozzle arranged so that the wire electrode enters the cutting area by a flowing function of with a fluid. In particular, on activation of the fluid nozzle, the wire electrode can be deflected from the feed direction into the cutting area. The fluid nozzle has the advantage that the deflection unit can be simply implemented and removal of wire pieces into the disposal container is simultaneously improved by the fluid flowing there.

According to another aspect of the invention, a wire transport system with such a wire cutting device and a wire disposal area is provided in an EDM machine.

According to another aspect of the invention a method for cutting a wire electrode in an EDM machine is provided. In the method the wire electrode is moved along a feed direction into a cutting zone of the EDM machine and the wire electrode running in the feed direction is entrained into the cutting area from the feed direction, for example, transversely to it or with at least one movement component perpendicular to the feed direction, in which at least one cutting edge acts on the wire electrode in the cutting area in order to sever it.

The method according to the invention has the advantage that cutting of the wire electrode occurs when the wire electrode is deflected from the feed direction. Because of this, the cutting process can be controlled so that, depending on the diameter and cross-sectional area of the wire electrode, the frequency of cutting processes can be adjusted, as is advantageous in particular with very small diameters of the wire electrode, in which case no cutting process is carried out and the wire electrode can pass through the wire cutting device unhampered.

According to another variant, the wire electrode running in the feed direction can be deflected after a certain advance of the wire electrode from the feed direction. In this manner the density of wire pieces in the disposal container can be optimized.

BRIEF DESCRIPTION OF THE DRAWINGS

Additional preferential variants of the invention are further explained below with reference to the accompanying drawings. In the drawings:

FIGS. 2a, 2b show a front view for a partial section of the wire cutting device of the variant according to FIG. 1;

FIG. 2c shows a detail of the front view according to FIG. 2a;

FIG. 2d shows a detail of a cutout of the wire cutting device of FIG. 2b;

FIG. 3a shows an enlarged view of the wire cutting device of FIG. 2a;

DETAILED DESCRIPTION

The individual elements of the different variants of the invention are provided with reference numbers. Identical reference numbers then correspond to the same elements or elements with the same or comparable function.

Figure 1:
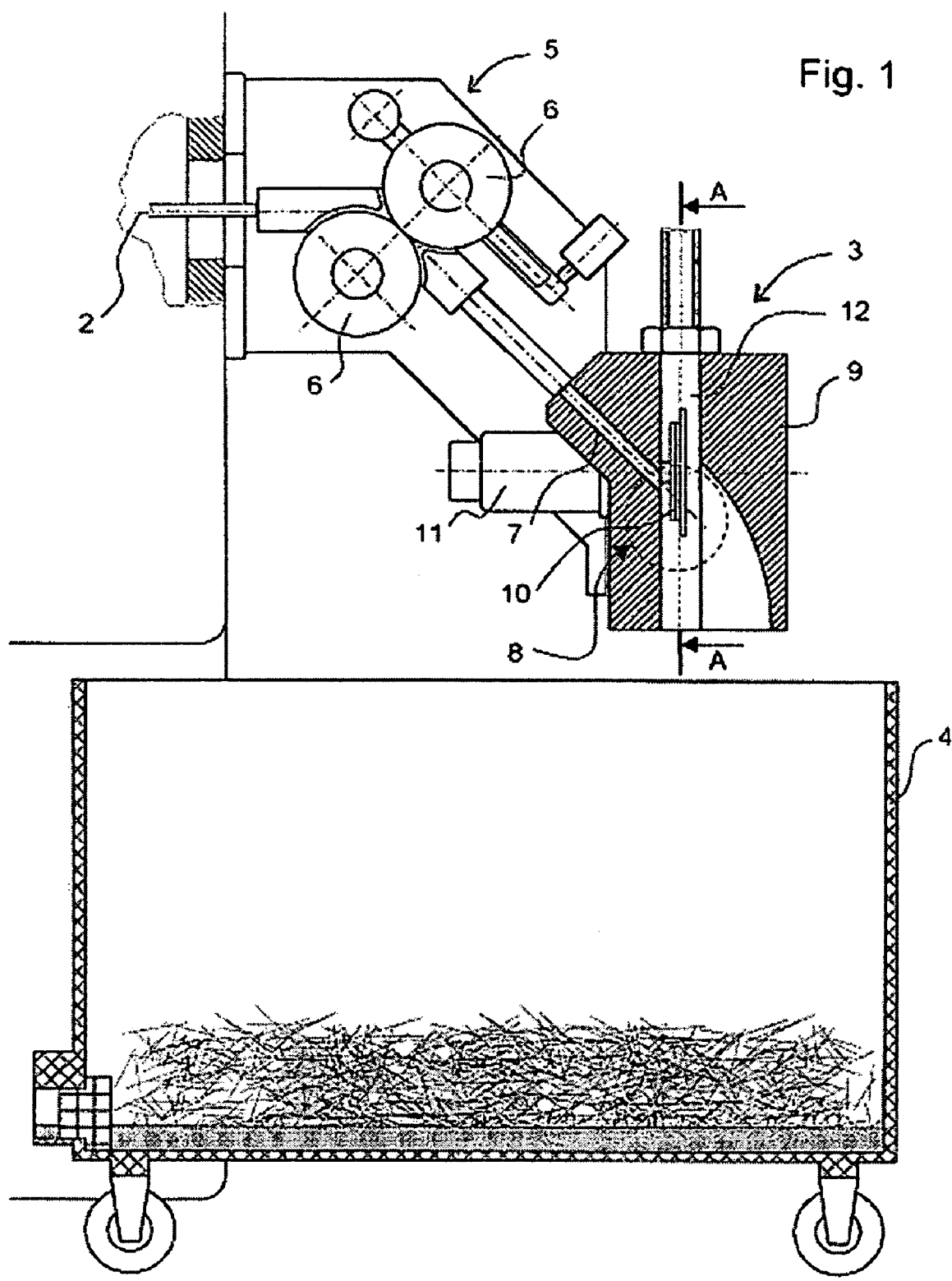
FIG. 1 shows a cutout of a wire transport system with a wire cutting device according to one variant of the invention.

A cutout of a wire transport system 1 of an EDM machine is shown in FIG. 1. The wire transport system 1 transports a wire electrode 2 through a working area of the EDM machine in which spark discharges are generated by means of wire electrode 2, with which material is removed from a workpiece. The wire electrode 2 also undergoes material removal so that the wire electrode 2 even during a short time in the work area is worn so that it is unusable for workpiece machining. For this reason the wire electrode 2 during machining of a workpiece is continuously guided through the work area and then disposed of in a disposal area. A wire cutting device 3, which cuts the spent wire electrode 2 into wire pieces and collects the wire pieces in a disposal container 4 for later disposal, is situated in the disposal area.

FIG. 1 shows the wire transport system 1 of a wire draw-off device 5, which pulls the wire electrode 2 through the work area and pushes it to the wire cutting device 3. The wire cutting device 3 is situated in the running direction of wire electrode 2 behind the wire draw-off device 5. The wire electrode 2 is moved in a specified feed direction into a cutting zone 8 of the wire cutting device 3. The cutting zone 8 is situated within a cutting housing 9, in which cutting elements 10 are situated, which are driven by a drive unit 11 mounted on the cutting housing 9. It can be prescribed that transport of the wire electrode 2 through a guide channel 7 into cutting housing 9 of the wire cutting device 3 be supported by a fluid flow. The cutting housing 9 has a flow channel 12, through which fluid is passed during operation. The flow channel 12 runs through the cutting zone so that the cut wire pieces are entrained from the cutting zone 8 in order to avoid possible clogging of wire pieces.

A sectional view through the wire cutting device 3 along line A—A of FIG. 1 is shown in FIG. 2a. The wire cutting device 3 has a first cutting element 15 and a second cutting element 16 designed as disks with a circular peripheral edge. The first and second cutting elements 15, 16 are preferably formed from a ceramic material having a rough surface, especially on its peripheral edges, in order to support entrainment of wire electrode 2 into the cutting area. The cutting elements 15, 16 are mounted to rotate relative to axes of rotation running perpendicular to the plane of the drawing in FIG. 2a, in which the two cutting elements 15, 16 slightly overlap. The degree of overlap is chosen in such way that on the overlapping boundaries the peripheral edges of the cutting elements 15, 16 form an acute cutting angle. The wire electrode 2 is severed by shearing on the edges of the cutting elements 15 and 16.

With reference to the plane of the drawing of FIG. 2a the guide channel 7 is situated behind the cutting elements 15, 16. The guide channel 7 guides the wire electrode 2 into the cutting zone near the overlapping region of the two cutting elements 15, 16. This is apparent from FIG. 2d, which shows a detail view of the cutting region of the wire cutting device.

The guide channel 7 guides the wire electrode 2 obliquely in the direction of the cutting zone without the wire electrode 2 reaching too close to the overlapping region so that the wire electrode 2 is not automatically grasped by the peripheral edge of one of the cutting elements 15, 16 and pulled in the direction of the overlapping region and cut there. The oblique guide channel also prevents the tip of the wire piece fed from feed channel 7 from being entrained upward by friction against the cutting elements 15, 16.

The inward movement of wire electrode 2 into the cutting region in which cutting engagement occurs by means of cutting elements 15, 16 on wire electrode 2 is accomplished with a deflection unit 17. The deflection unit 17 deflects the wire electrode 2 from the feed direction into the cutting zone and entrains it so that it reaches the cutting area. In the depicted variant of FIG. 2b, the deflection unit 17 is designed in disk-shape with a circular peripheral edge as driver disk and has stop elements 18, for example four stop elements. The deflection unit 17 is coupled to the first cutting element 15 so that it rotates around the same axis of rotation, preferably with the same angular velocity. In particular, the deflection unit 17 can be firmly connected to the first cutting element 15. During rotation of the first cutting element 15, the stop elements 18 grasp the wire electrode 2 pushed by the guide channel 7 at specified time intervals and guide the wire electrode 2 into the cutting area so that it is severed between the first and second cutting elements 15, 16. During severing of wire electrode, two wire pieces are formed, since the wire electrode 2 is ordinarily moved continuously through the guide channel 7 and thus a wire piece is moved into the cutting zone 8 before this wire piece of the wire electrode 2 is grasped by one of the stop elements 18 and brought into cutting engagement with the first and second cutting elements 15, 16.

The first cutting element 15 in the variant depicted here is driven by drive unit 11 and the second cutting element 16 is merely mounted to rotate. The second cutting element 16 lies on the side of the first cutting element 15 in the overlapping region and is entrained by it. In order to always guarantee sufficient pressure in the overlapping region against the first cutting element 15, the second cutting element 16 can be forced against the first cutting element 15, for example, by means of a spring in the axial direction (not depicted).

The cutting area in which the wire electrode 2 is cut into pieces is shown in an enlarged depiction in FIG. 2c. The overlapping area of the cutting elements 15, 16 produces a lenticular surface in which the two cutting elements 15, 16 lie against each other. The deflection unit 17 is firmly connected to the first cutting element 15 and has stop elements 18 that are also connected to each other by an outer ring 19. They form a passage 20 through the deflection unit 17, through which the wire electrode 2 is guided during its movements in the feed direction.

During operation the wire electrode 2 is guided by the guide channel 7 and moved between the two cutting elements 15, 16 into a passage 20 of the deflection unit 17. By rotation of the deflection element 17, the advanced wire electrode 2 is enclosed on all sides. Rotation of the deflection unit 17 now continuously reduces the cross-section 21 of the wedge-shaped window formed between cutting elements 15, 16 and the stop element of deflection unit 17 and the stop element moves the advanced wire electrode 2 into the cutting area formed by the cutting elements 15, 16. The stop elements 18 are configured so that they advance the wire electrode 2 with a continuous movement, i.e. they can have a curvature in order to grasp the wire electrode 2 and deflect the wire electrode 2 on further rotation of deflection unit 17 so that no impacts are exerted on the wire electrode 2.

The advanced wire electrode 2 in no case reaches the cutting area of the cutting elements 15, 16 in uncontrolled fashion, because this would lead to unnecessary increased stress on the moving parts and increased current demand and increased wear. The geometry, position, alignment of the guide channel 7 in the cutting housing 9 is therefore configured in such way that each type of wire and each wire diameter can enter the cutting zone 8 with safe spacing from the cutting area with allowance for intrinsic rigidity and intrinsic curvature.

During operation of the EDM machine with fine wire electrodes, the wire cutting device 3 is often switched off. It must therefore be ensured that no obstacle lies in the cutting zone 8. For this purpose the drive 11 of the wire cutting device 3 could be equipped with an angle rotation sensor. If the wire cutting device 3 is now switched off, the control of the EDM machine can operate drive 11 so that no stop element 18 arrives in front of the output of the guide channel 7.

The length of the cut wire pieces is dependent on the advance speed of the wire electrodes 2, the speed of drive unit 11 and the number of stop elements 18 of deflection unit 17. The wire cutting device 3 and the wire draw-off device 5 can be coupled via a gear mechanism so that the cutting frequency is proportional to the wire advance speed and therefore the cut wire pieces always have the same length.

Figure 3A:
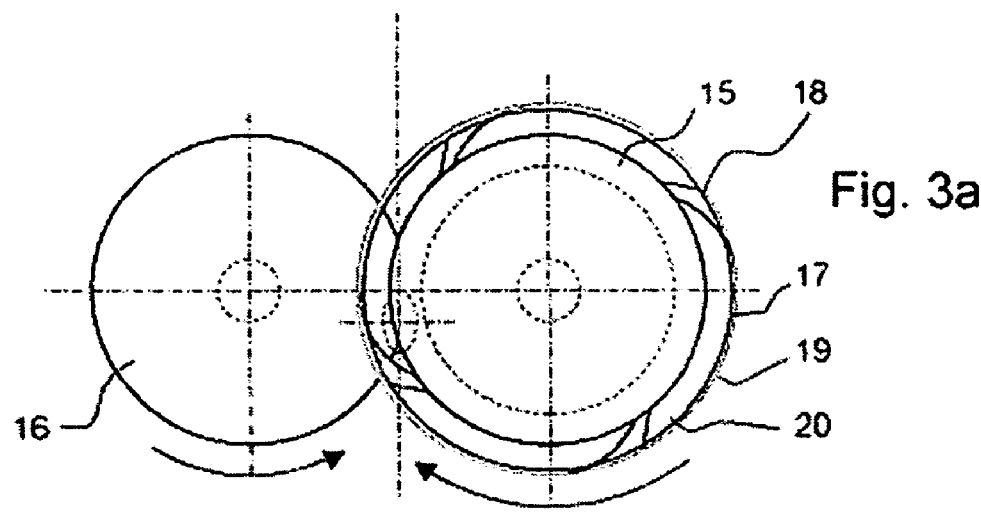
Figure 3B:
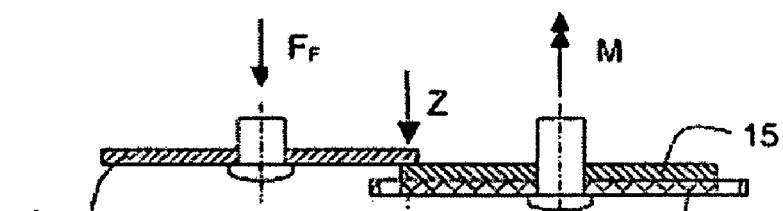
FIGS. 3b, 3c, 3d show a top view of preferential axial arrangements of the cutting elements and wire cutting device according to different variants.
Figure 3C:
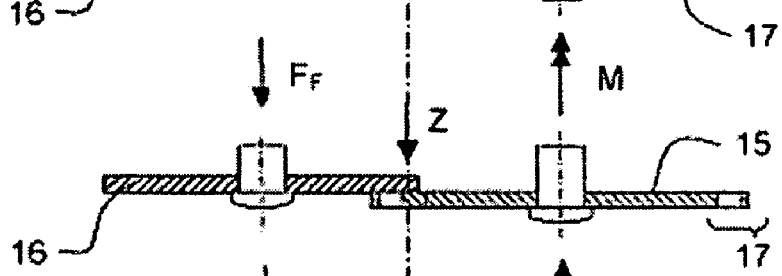
Figure 3D:
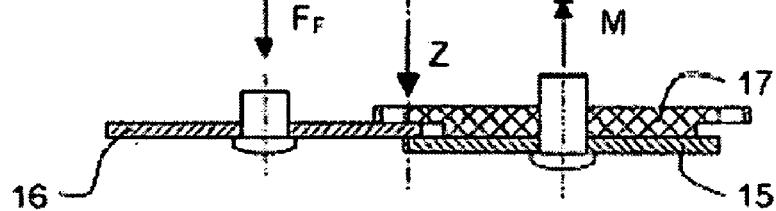

FIGS. 3a to 3d show different possibilities for arranging the two cutting elements 15, 16 and deflection unit 17. In FIG. 3a the arrangement of the two cutting elements 15, 16 and the deflection unit 17 designed as a drive disk is shown again. As shown in FIG. 3d, the second cutting element 16 is situated relative to the feed direction Z of wire electrode 2 in front of the first cutting element and the driver disk 17 is coupled to the first cutting element 15 and is situated in feed direction Z behind the first cutting element 15. The second cutting element 16 is loaded with a spring force $F_F$ that forces the second cutting element 16 in feed direction Z of wire electrode 2 against the first cutting element 15.

It is shown in FIG. 3c that the first cutting element 15 and the deflection unit 17 are designed integrated. The stop elements 18 are directly mounted on the peripheral edge of the first cutting element 15 and the outer ends of the stop elements 18 are connected to each other with the outer ring 19. The passages 20 are formed by the peripheral edge of the first cutting element 15, the stop elements 18 and the outer ring 19.

FIG. 3d shows another variant of the arrangement of the cutting elements 15, 16, as well as the driver disk 17. In this variant the driver disk 17 is still arranged in feed direction Z in front of the second cutting element 16 and coupled to the first cutting element 15.

In the depicted practical example, the second cutting element lies against the first cutting element 15 in the overlapping area and is moved by it. It can also be prescribed that the two cutting elements are moved separately from each other, for example by separate drive units.

In the depicted variants, the cutting elements 15, 16 are designed as ceramic disks that have sharp edges on their peripheral edges to sever the wire electrode 2. Naturally, the cutting elements 15, 16 can also be made from other wear-resistant material.

To reduce friction between the cutting elements 15, 16 a fluid can be fed to the cutting zone 8 during operation. This fluid can be supplied via the flow channel 12, via the fluid stream provided for transport of the wire electrode 2 through the guide channel 7, but can also be guided to the cutting zone 8 via additional fluid lines, for example, via a fluid nozzle directed into the overlapping area.

Figure 4:
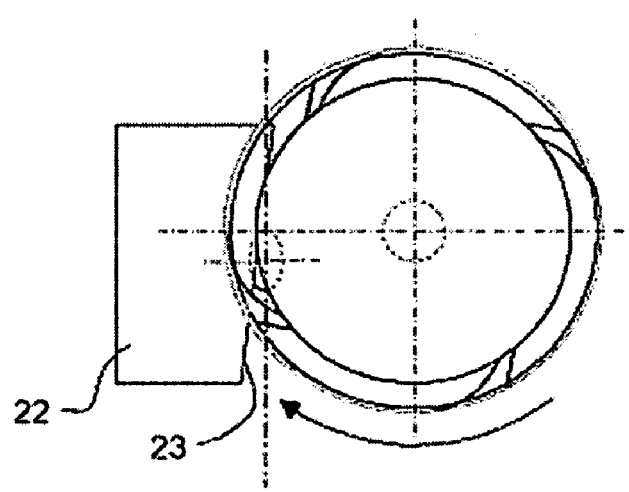
FIG. 4 shows the cutting elements of a wire cutting device according to another variant of the invention.

In the variant schematically shown in FIG. 4, instead of the disk-shaped second cutting element 16, a mating element 22, having a fixed cutting edge 23 is provided. The cutting edge 23 of the mating element 22 overlaps the first cutting element 15 and forms an overlapping area in which the peripheral edge of the first cutting element 15 and the cutting edge 23 form a cutting area. Preferably the cutting edge 23 of the mating element 22 and the peripheral edge of the first cutting element 15 are arranged relative to each other so that they form an acute angle in the cutting area. The mating element 22 is firmly connected to the cutting housing 9 and therefore cannot be moved by the rotating first cutting element 15. The wire electrode 2 advanced into the cutting zone 8 is also moved, as in the variants just described, by means of the deflection unit 17, for example, by means of the stop elements 18 of the driver disk 17, into the cutting area in order to enter into cutting engagement with the cutting element and the mating element 22.

Figure 5:
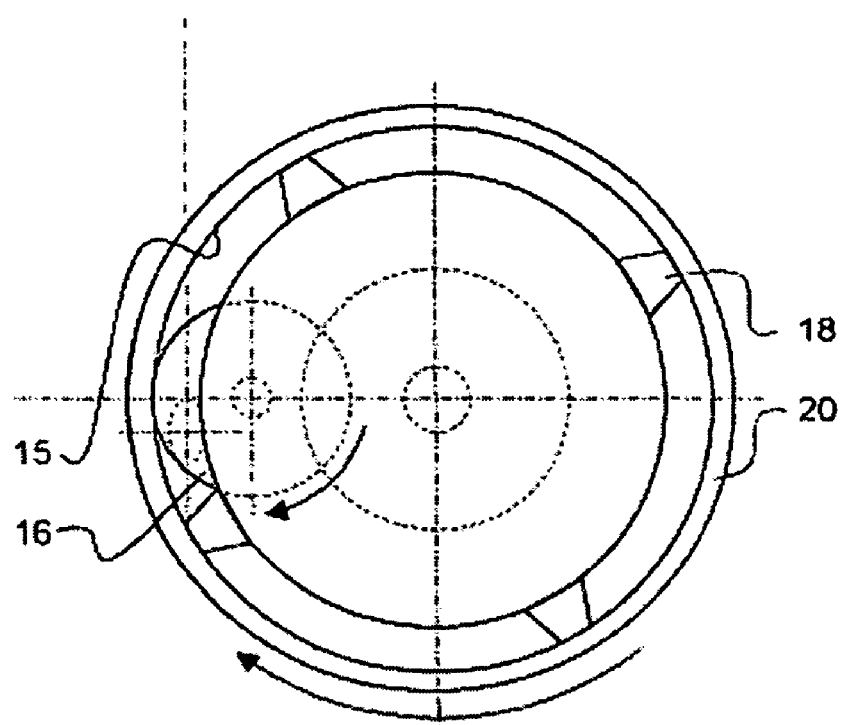
FIG. 5 shows another variant of an arrangement of the cutting elements in another variant of the invention.

Another variant of the wire cutting device 3 according to the invention is schematically depicted in FIG. 5, with reference to arrangement of the cutting elements 15, 16 and the driver disk 17. There the first cutting element 15 is designed merely as a ring mounted on driver disk 17. The driver disk 17 has an inner disk, the stop elements 18 and an outer ring 20, which connects the stop elements 18 to each other, in order to form passages between the inner disk and the outer ring. The outer ring 20 can then be designed as the first cutting element 15 or be provided concentrically with an annular first cutting element so that the inside diameter of the annular first cutting element 15 is somewhat smaller than the inside diameter of the outer ring 20 of driver disk 17.

The second cutting element 16, viewed in the direction of the axis of rotation, is arranged within the outer ring 20 or the annular first cutting element 15 so that the cutting area is formed by the peripheral edge of the second cutting element 16 and the inside edge of the annular first cutting element 15. Also in this arrangement the cutting elements overlap so that the cutting edges form an acute angle in the cutting area. The direction of rotation of the second cutting element 16 preferably corresponds to the direction of rotation of the first cutting element 15. In this variant the design volume of the wire cutting device 3 is more compact.

Figure 6A:
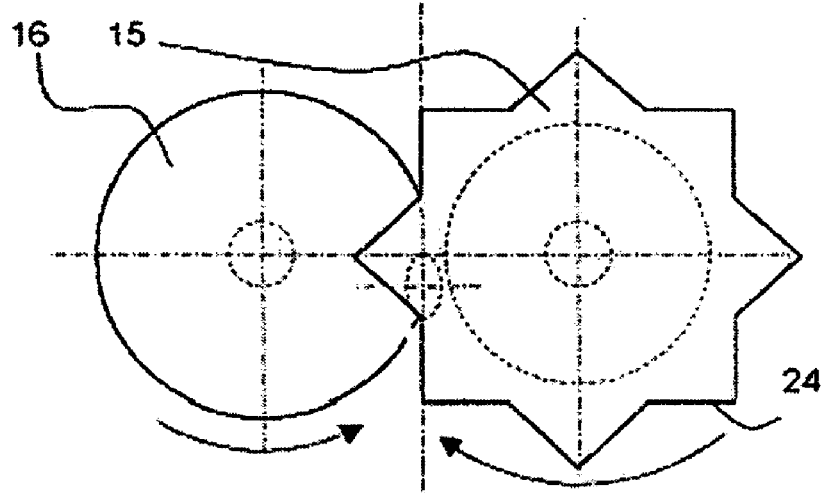
FIGS. 6a, 6b show additional variants with alternative geometries of the cutting elements.
Figure 6B:
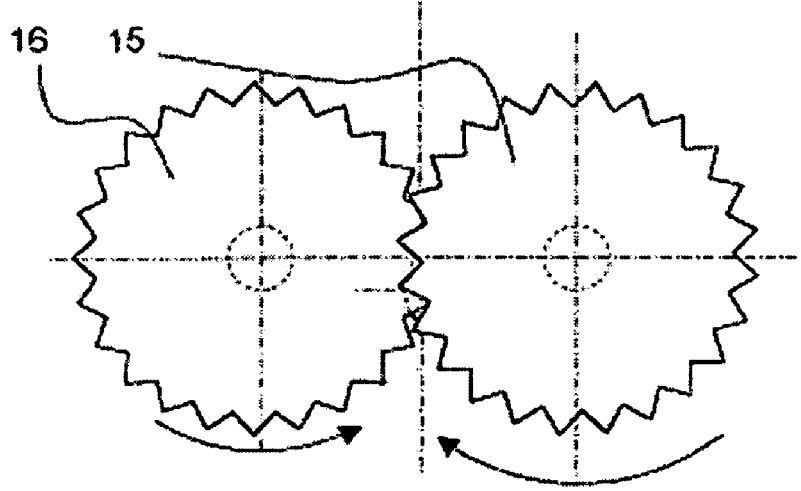

Additional variants of the wire cutting device 3 are schematically depicted in FIGS. 6a and 6b. In these variants the peripheral edge of the cutting elements 15, 16 is not designed as circular, but has teeth or general protrusions and recesses that simultaneously form stop edges of the deflection unit 17 so that no additional deflection unit 17 need be provided, apart from the cutting elements 15, 16. In the depicted example, the deflection unit 17 is formed by the protrusions and recesses on the peripheral edge of the cutting elements 15, 16.

As shown in FIG. 6a, the first cutting element is designed with triangular protrusions (teeth 24) on its peripheral edge, whereas the second cutting element 16 is circular and essentially unchanged. The two cutting elements 15, 16 overlap. The teeth 24 form stop edges that entrain the advanced wire electrode 2 and deflect it into the cutting area formed by the outer edges of the overlapping area.

As shown in FIG. 6b, both cutting elements 15, 16 can also be provided with toothed peripheral edges. The number of teeth and their spacings on the peripheral edge of cutting elements 15, 16 influence the length of the cut wire pieces. The two cutting elements 15, 16 are arranged overlapping.

Figure 7A:
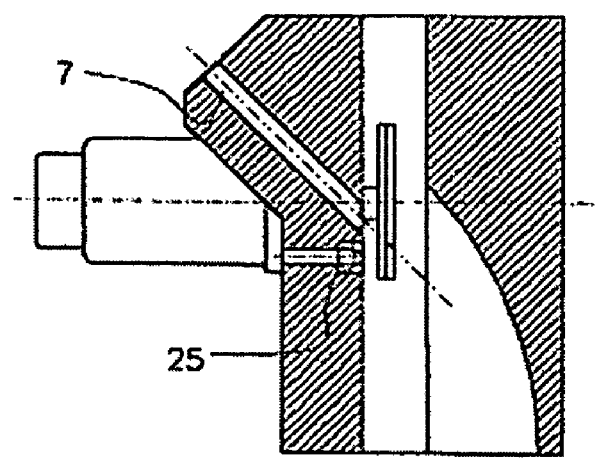
FIGS. 7a and 7b show another variant of the wire cutting device according to the invention with a fluid nozzle.
Figure 7B:
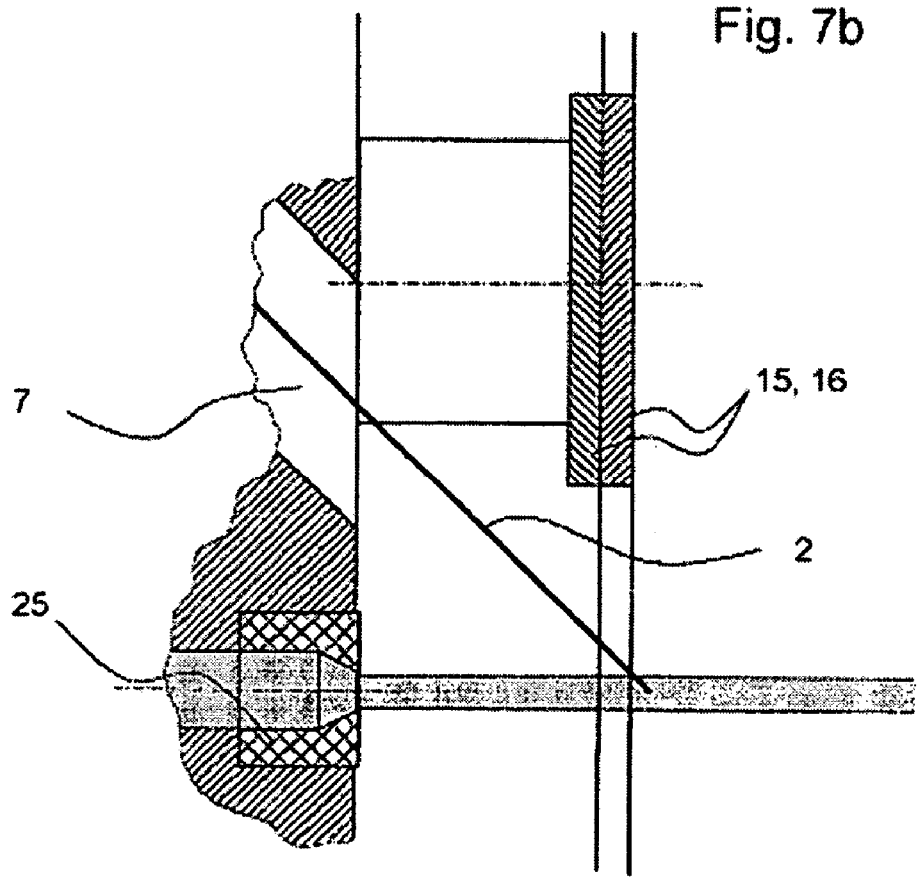

A cross-sectional view of another variant of the wire cutting device 3 according to the invention is shown in FIGS. 7a and 7b. FIG. 7a, as in the preceding practical example, shows two cutting elements 15, 16 that overlap with each other forming a cutting area for the advanced wire electrode 2. The deflection unit in this variant, however, is formed by means of a fluid nozzle 25. The fluid nozzle 25 is activated at time intervals in order to deflect the wire electrode 2 from the feed direction Z and force it into the cutting area by means of a fluid jet, for example, a jet of deionized water. By appropriate control of the fluid nozzle 25, with knowledge of the advance speed of wire electrode 2, the length of the cut-off wire pieces can be precisely established. The provision of the fluid nozzle 25 as deflection unit has the advantage that the number of moving parts can be reduced and the susceptibility to disturbance of the wire cutting device 3 is therefore reduced. In contrast to the variants described above in which deflection of the wire electrode 2 is produced by means of a driver disk 17, in this variant no obstacle is present in cutting zone 8 after switching off of the fluid jet. An angle rotation sensor is not necessary in this variant.

The cutting elements 15, 16, the feed channel 7 and the fluid nozzle 25 can be aligned relative to each other so that either the fluid nozzle 25 forces the wire electrode 2 into the cutting area during application or, in another variant, the wire electrode 2 is forced out of the cutting area when the feed channel 7 deflects the wire electrode directly into the cutting area. By switching off fluid nozzle 25, the wire electrode 2 can therefore be guided into the cutting area, whereas the wire electrode 2 is deflected into the cutting area when the fluid nozzle 25 is activated.

In a particularly preferred embodiment according to FIGS. 7a and 7b, the fluid nozzle 25 is essentially active in uninterrupted fashion so that a constant fluid jet is produced. The wire electrode 2 advanced by the wire draw-off device 5 enters the region of effect of the fluid jet so that the wire electrode 2 is forced into the cutting area. Deflection is then produced directly by advance of the wire electrode 2. The length of the cut-off wire pieces in this variant is independent of the wire advance speed. It is obtained merely from the geometric conditions in the wire cutting device and corresponds roughly to the spacing between the lower intersection point of the first cutting element 15 with the second cutting element 16 and the intersection point of the advanced wire electrode with the fluid jet generated by the fluid nozzle 25.

The cutting elements 15, 16 operate over their entire periphery so that they are subject to uniform wear and guarantee reliable severing of the wire electrode and provide a long lifetime. The drive unit 11 of the wire cutting device 3 can operate with constant speed. The wire draw-off device 5 and the wire cutting device 3 can have a common drive. The flow channel 12 and fluid nozzle 25 can be supplied together. The cost of assembly and operation is extremely low, in particular, no adjustment is required for different wire types and wire diameters, since the cutting elements lie against each other free of play. Finally, the present embodiment of the wire cutting device 3 has the advantage that even in the case of damage to the wire cutting device 3 operation of the EDM machine can be maintained at least for a certain time.

The invention claimed is:

1. Wire cutting device for an electrical discharge machining (EDM) machine comprising:
   a wire draw-off device that moves a wire electrode along a feed direction into a cutting zone of the EDM machine; and,
   a deflection unit that deflects the wire electrode running into the cutting zone in the feed direction into a cutting area after a specified advance of the wire electrode so that at least one cutting edge acts on the wire electrode in the cutting area in order to cut the wire electrode.

2. Wire transport system with a wire cutting device according to claim 1 in a wire disposal area of an EDM machine.

3. Wire cutting device according to claim 1, wherein the wire cutting device comprising a first cutting element rotating around an axis of rotation, with a peripheral edge designed at least partially as the first cutting edge, and a second cutting element with a second cutting edge, in order to form the cutting area; and wherein the feed direction of the wire electrode runs across the cutting edges and at least with one direction component parallel to the axis of rotation of the first cutting element.

4. Wire cutting device according to claim 3, wherein the first cutting edge of the first cutting element and the second cutting edge form an acute angle in the cutting area.

5. Wire cutting device according to claim 3, wherein the second cutting element is rotatable and the second cutting edge is formed on a peripheral edge of the second cutting element.

6. Wire cutting device according to claim 5, wherein the second cutting element is configured in order to rotate in an opposite direction of rotation relative to the first cutting element.

7. Wire cutting device according to claim 6, wherein the second cutting element is coupled to the first cutting element so that the second cutting element rotates due to rotation of the first cutting element.

8. Wire cutting device according to claim 7, wherein a section of the first cutting element lies against a section of the second cutting element so that during rotation of the first cutting element the second cutting element is entrained by at least one of frictional and shape-mating engagement.

9. Wire cutting device according to claim 3, wherein the deflection unit has at least one stop element movable so that the wire electrode is deflected from the feed direction into the cutting area.

10. Wire cutting device according to claim 9, wherein the deflection unit is coupled to at least one of the first cutting element and the second cutting element so that the wire electrode moved in the feed direction is cyclically grasped by the stop element and moved into the cutting area.

11. Wire cutting device according to claim 10, wherein the deflection unit and one of the first cutting element and the second cutting element is designed as one unit.

12. Wire cutting device according to claim 9, wherein the stop element protrudes from the peripheral edge of at least one of the first and the second cutting element.

13. Wire cutting device according to claim 12, wherein several stop elements are provided on the peripheral edge of at least one of the first and the second cutting element in which, with reference to an axis of rotation of the first cutting element and the second cutting element, outermost ends of the stop elements are connected to each other with an outer ring, so that two adjacent stop elements, the cutting edges of the first cutting element and the second cutting element and the outer ring form a passage through which the wire electrode is guided.

14. Wire cutting device according to claim 3, wherein at least one of the first cutting element and the second cutting element has a peripheral edge with one or more protrusions on which stop edges are situated.

15. Wire cutting device according to claim 3, wherein the second cutting element is fixed.

16. Wire cutting device according to claim 3, wherein the deflection unit has a fluid nozzle arranged so that the wire electrode enters the cutting area as a function of flow with a fluid.

17. Method for cutting of a wire electrode in an electrical discharge machining (EDM) machine, comprising:
moving a wire electrode along a feed direction into a cutting zone of an EDM machine; and deflecting the wire electrode from the feed direction into a cutting area after a specified advance of the wire electrode so that at least one cutting edge acts on the wire electrode in the cutting area in order to cut the wire electrode.

* * * * *